United States Patent
Shroff et al.

(10) Patent No.: US 9,330,255 B2
(45) Date of Patent: May 3, 2016

(54) METHOD AND SYSTEM FOR MONITORING A COMPUTER SYSTEM

(75) Inventors: Chirag Shroff, Apex, NC (US); Larus Maxwell, Raleigh, NC (US); Anthony Grieco, Wake Forest, NC (US)

(73) Assignee: Cisco Technology, Inc., San Jose, CA (US)

(*) Notice: Subject to any disclaimer, the term of this patent is extended or adjusted under 35 U.S.C. 154(b) by 70 days.

(21) Appl. No.: 13/463,466

(22) Filed: May 3, 2012

(65) Prior Publication Data

US 2013/0298239 A1  Nov. 7, 2013

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 15/16* | (2006.01) | |
| *G06F 21/55* | (2013.01) | |
| *G06F 11/30* | (2006.01) | |
| *G06F 21/56* | (2013.01) | |
| *H04L 29/06* | (2006.01) | |

(52) U.S. Cl.
CPC .............. *G06F 21/55* (2013.01); *G06F 11/302* (2013.01); *G06F 11/3055* (2013.01); *G06F 21/567* (2013.01); *G06F 12/1408* (2013.01); *H04L 63/107* (2013.01); *H04L 63/12* (2013.01)

(58) Field of Classification Search
CPC ....... H04L 63/11; H04L 63/107; H04L 63/12; G06F 21/62

USPC ............................................ 726/23; 709/229
See application file for complete search history.

(56) References Cited

U.S. PATENT DOCUMENTS

| | | | | |
|---|---|---|---|---|
| 7,457,951 | B1* | 11/2008 | Proudler et al. | 713/164 |
| 2004/0259633 | A1* | 12/2004 | Gentles | G07F 17/32 463/29 |
| 2008/0256595 | A1* | 10/2008 | Schunter et al. | 726/1 |
| 2010/0235915 | A1* | 9/2010 | Memon et al. | 726/23 |
| 2013/0024930 | A1* | 1/2013 | Steil | G06F 21/575 726/16 |
| 2013/0111587 | A1* | 5/2013 | Goel et al. | 726/23 |

OTHER PUBLICATIONS

Rudolfo Pellizzoni, Patrick Meredith, Marco Cacamo, Grigore Rosu, Department of Computer Science, University of Illinois at Urbana-Champaign, *Hardware Runtime Monitoring for Dependable COTS-based Real-Time Embedded Systems*, 2008 Real-Time Symposium.

\* cited by examiner

*Primary Examiner* — Linglan Edwards
*Assistant Examiner* — Lawrence Cosby

(57) ABSTRACT

In one embodiment, a method for monitoring a computer system that includes activating and controlling a target processor by way of an electromagnetic signal. The method also includes generating a key for a computer security method via processor readable instructions stored on a first memory device; transmitting the key to the target processor via an electromagnetic signal; and requesting the target processor to perform the computer security method on a target memory device via an electromagnetic signal, where the computer security method uses the key as a seed.

20 Claims, 5 Drawing Sheets

METHOD AND SYSTEM FOR MONITORING A COMPUTER SYSTEM

FIELD

The present disclosure relates generally to monitoring computer systems.

BACKGROUND

Computer systems, such as operating system(s) (OS) for a computer or network device, can be subject to various attacks. For example, such attacks can be directed at execution paths or executable files of an operating system. Fortunately, there are existing modifications that can make attacks more difficult. Specifically, preventative technologies like address space layout randomization (ASLR) have been used to randomize memory locations of OS components making it more difficult for attackers to find specific code. Other data security technologies, such as whole disk encryption, also make it more difficult for attackers to find specific code.

Another form of OS security is software monitoring, which can include solutions from the very simple to the complex. One problem with monitoring solutions is that they generally lack a secure place to stand. In other words, such monitoring systems typically monitor the OS that they require for support. For example, typical antivirus software is subject to being circumvented because it is trying to run on a platform that it is attempting to monitor. In other cases where there is a secure place to stand, monitoring techniques are complex and processor intensive. Additionally, preventative techniques, such as ASLR, make monitoring even more complex and problematic.

DESCRIPTION OF EXAMPLE EMBODIMENTS

Overview

Figure 1:
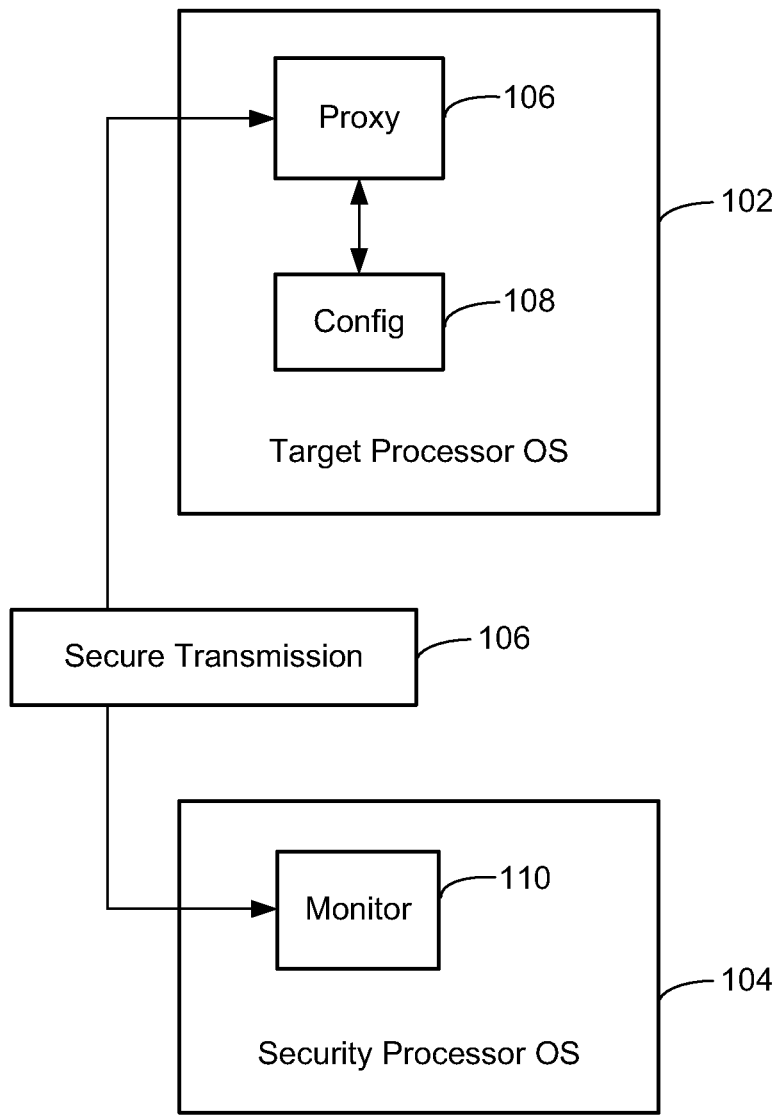
FIG. 1 illustrates a block diagram of example operating system(s) (OS) executed by an example security processor and an example target processor.

In one embodiment, a method for monitoring a computer system that includes activating and controlling a target processor by way of an electromagnetic signal. The method also includes generating a key for a computer security method via processor readable instructions stored on a first memory device, and transmitting the key to the target processor via an electromagnetic signal. Further, the method includes requesting the target processor to perform the computer security method on a target memory device via an electromagnetic signal, where the computer security method uses the key as a seed.

Example Embodiments

As mentioned above, when monitoring a computer system from a secure place to stand, the monitoring techniques implemented can be complex and processor intensive. Additionally, preventative techniques, such as address space layout randomization (ASLR) and data encryption, can make such monitoring even more complex and problematic. Therefore, it is of great interest to develop a system that enables monitoring from a secure place to stand and that can be effective in the presence of preventative security techniques such as ASLR. Described herein is a system for performing such functionality (hereinafter the monitoring system).

In one aspect of the monitoring system, included is a security processor that when executed activates, controls, and monitors a target processor and a target memory device (coupled to the target processor) that is secured by a computer security method, such as ASLR. The target processor and the target memory device are a slave to the security processor. Particularly, the security processor or a security computer program executed by the security processor, e.g., a monitor application, generates a key, e.g., a random number, for a computer security method, e.g., ASLR, via processor readable instructions stored on a first memory device (typically coupled to the security processor). Next, a transmission part of the monitoring system transmits the key from the security processor to the target processor via an electromagnetic signal, and then the security processor requests that the target processor performs the computer security method on the target memory device using the key as a seed for rendering the computer security method. By being in a secure place to stand and being aware of the seed for rendering the computer security method, the security processor can control and monitor the target processor secured by a preventative security method, such as ASLR.

In some embodiments of the monitoring system, included is a security proxy that acts as a slave to the security processor. In some embodiments, the target processor can execute the security proxy, but in such cases, the security processor still has control over the proxy. The security proxy can perform the computer security method on the target memory device and facilitate the monitoring of the target processor and the target memory device. The security proxy acts as an agent for the security processor, so that the security processor does not communicate directly with the target processor. Further, in some of these embodiments, the security processor can request and receive data that corresponds to the security proxy, where the data can come directly from the target memory device. Also, such data corresponding to the security proxy can be obtained prior to requesting the target processor to perform the computer security method on the target memory device. This can prevent the security processor from deploying the security method on the target memory device if the security proxy has already been infected or corrupted. Also, the security proxy can be a thin security proxy or a thick security proxy. The thin security proxy differs from the thick security proxy, in that the thin proxy is a thin client. The thin security proxy acts as an intermediate in communicating information regarding the target memory device and/or target processor to the security processor or the security computer program. The thick security proxy can process the information and data related to the target memory device and/or the target processor, including information related to the security method (e.g., ASLR). The thick proxy can also run and manage the security method.

In some embodiments of the monitoring system, via the security proxy or directly, the security processor monitors not only the target processor and the target memory device, but also a target operating system (OS) executed by the target processor and stored on the target memory device. This monitoring can occur while the target OS is executing. Data regarding the status of the target OS is communicated from the target memory device, directly or through the security proxy, and to the security processor or a computer program executed by and closely coupled to the security processor, e.g., the monitor application. In some embodiments, the target OS can host the security proxy. Also, in some embodiments, the security processor can execute a Security OS that can host the computer program executed and closely coupled to the security processor.

FIG. 1 illustrates a block diagram of example respective OS 102 and 104 executed by a target processor (e.g., a target processor 202, 302, or 402 of FIG. 2, 3, or 4, respectively) and a security processor (e.g., a security processor 204, 304, or 404 of FIG. 2, 3, or 4, respectively) of an example embodiment of the monitoring system. The OS 102 executed by the target processor, the target OS, hosts a security proxy 106 and a configuration file 108. The OS 104 executed by the security processor, the security OS, hosts a monitor application 110. The security processor via the monitor application 110 or another computer program monitors the target OS 102 via the security proxy 106 that receives data regarding the status of data and files used by the target OS 102 via a file or system memory, such as the configuration file 108 or a data structure in the target memory device. In some embodiments, hashes can be computed instantly upon demand and can be secured by an additional security method, such as encryption. Communication between the security proxy 106 and the monitor application 110 is by way of a secure transmission line 106 (e.g., a transmission line 206, 306, or 406 of FIG. 2, 3, or 4, respectively), such as an encrypted wired or wireless signal. Further, the monitor application 110 or another computer program hosted by the security OS 104 can generate a key for a security method, such as a random number for ASLR.

With respect to the implementation of the monitor application 110, the security proxy 106, the operating systems 102 and 104, and any other security computer program executed by the target processor or the security processor, the implementation can be software executed by at least one of the processors, a field-programmable gate array (FPGA), an application-specific integrated circuit (ASIC), and/or any other physical embodiment of processor executable instructions. In some embodiments, the FPGA and/or the ASIC are closely couple to their respective processor and can have at least the ability to read a respective memory device completely. Also, with reference to all the components of the monitoring system described herein, such components can be embodied in software, firmware, and/or hardware.

Figure 2:
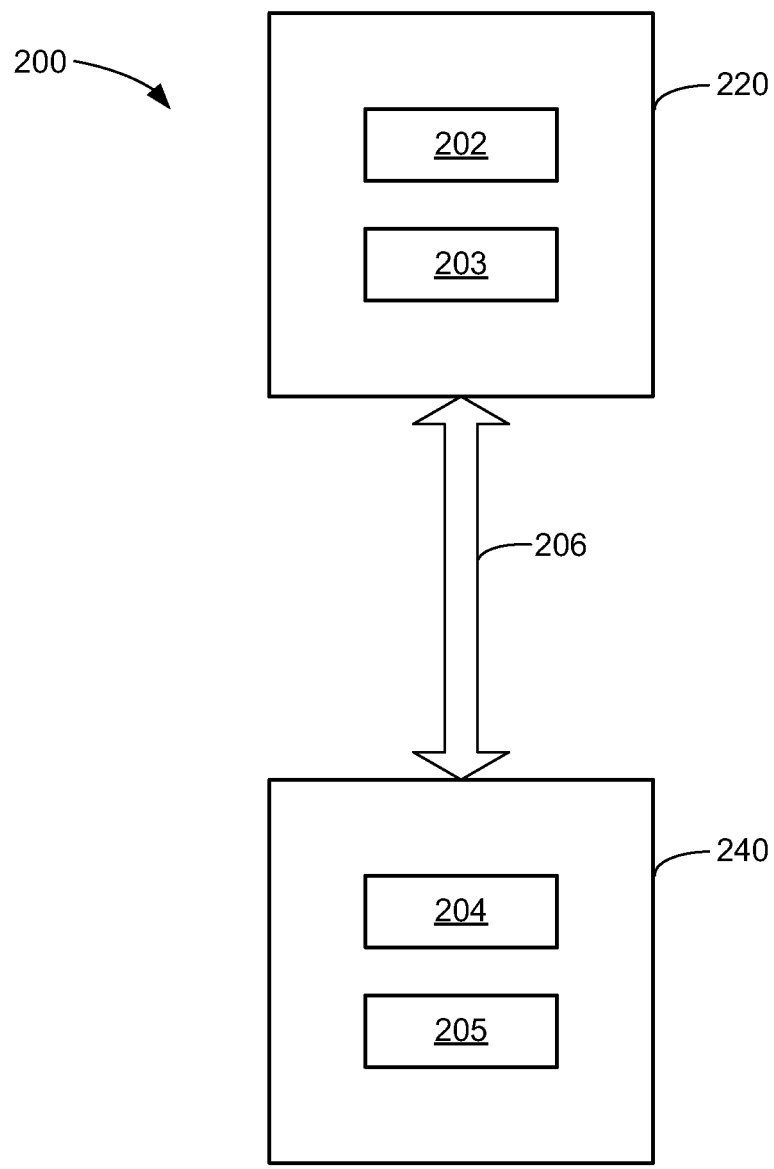
FIG. 2 illustrates a block diagram of an example network that can implement an example monitoring system.

FIG. 2 illustrates a network 200 that can implement the monitoring system, where the network 200 includes a target device 220 (including a target processor 202 and a target memory device 203), a security device 240 (including a security processor 204 and a security memory device 205), and a secure transmission line 406 that connects the two devices 220 and 240. The secure transmission line 206 can be any transmission line, wireless or wired, that facilitates secure communication through a secure communication method such as encryption. The two devices 220 and 240 can be any electronic device, such as a personal computer, server, router, bridge, switch, hub, repeater, modem, network interface controller, network driver, or adapter. The respective processors 202 and 204 can be any central processing unit (CPU). The respective memory devices 203 and 205 can be any primary (directly accessible by the CPU) or secondary storage device (indirectly accessible by the CPU, such as a peripheral storage device). Also, the respective processors 202 and 204 can be coupled tightly or loosely to the respective memory devices 203 and 205.

Figure 3:
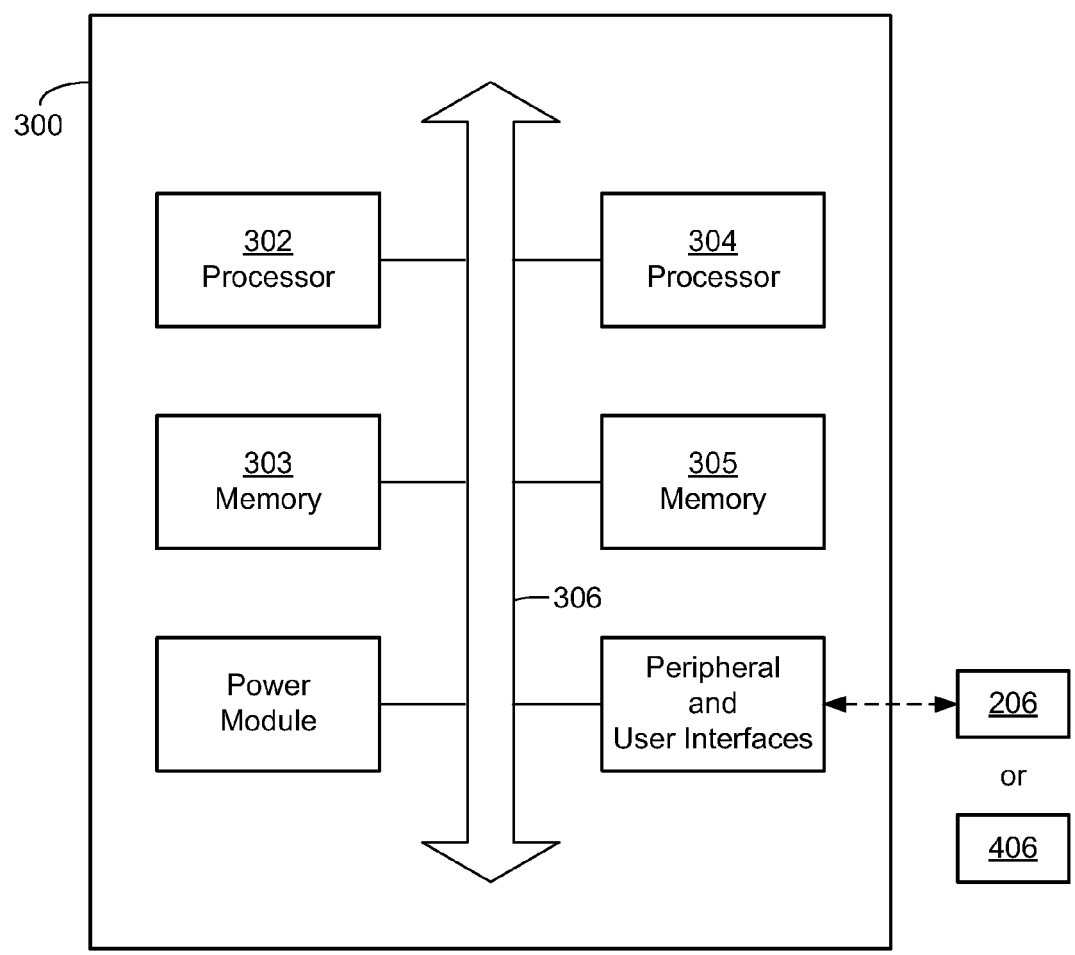
FIG. 3 illustrates a block diagram of an example electronic device that can implement an example monitoring system.

FIG. 3 illustrates a single electronic device 300 that can implement the monitoring system on its own. The electronic device 300 can be any electronic device having coprocessors, e.g., a target coprocessor 302 and a security coprocessor 304 as depicted in FIG. 3, and can be one of the respective devices 220, 240, 420, or 440 of FIGS. 2 and 4. Each coprocessor 302 and 304 can be coupled tightly or loosely to one or more memory devices, e.g., a respective target memory device 303 and/or a respective security memory device 305. Also, any component of the electronic device 300 can communicated with another component of the electronic device via a secure transmission line, such as a secured bus 306. Further, the secure transmission line can be secured by any security technology, including encryption and/or a firewall device. In some embodiments of the monitoring system, the one or more memory devices can be solely coupled to one of the coprocessors. Also, in some embodiments, each of the coprocessors can only access their respective memory device. Further, depending on the physical limitations of an embodiment, the respective memory devices can be any primary (directly accessible by the CPU) or secondary (indirectly accessible by the CPU) storage device.

Further, is some embodiments, especially in embodiments with coprocessors, the security processor 304 activates prior to any other coprocessor. For example, by first activating the security processor 304, such as in a reboot, the security processor can take control and monitor the memory devices and other processors prior to the activation of these other components. Particularly, in some embodiments, the security processor can activate, reset, and/or put on hold the activation of the other coprocessors. Also, in some of the embodiments utilizing coprocessors, the coprocessors can be physically embodied on one silicon chip or can be embodied on separate chips or electronic devices. Further, each of the coprocessors can be a standalone processor or a core of a multi-core processor.

Figure 4:
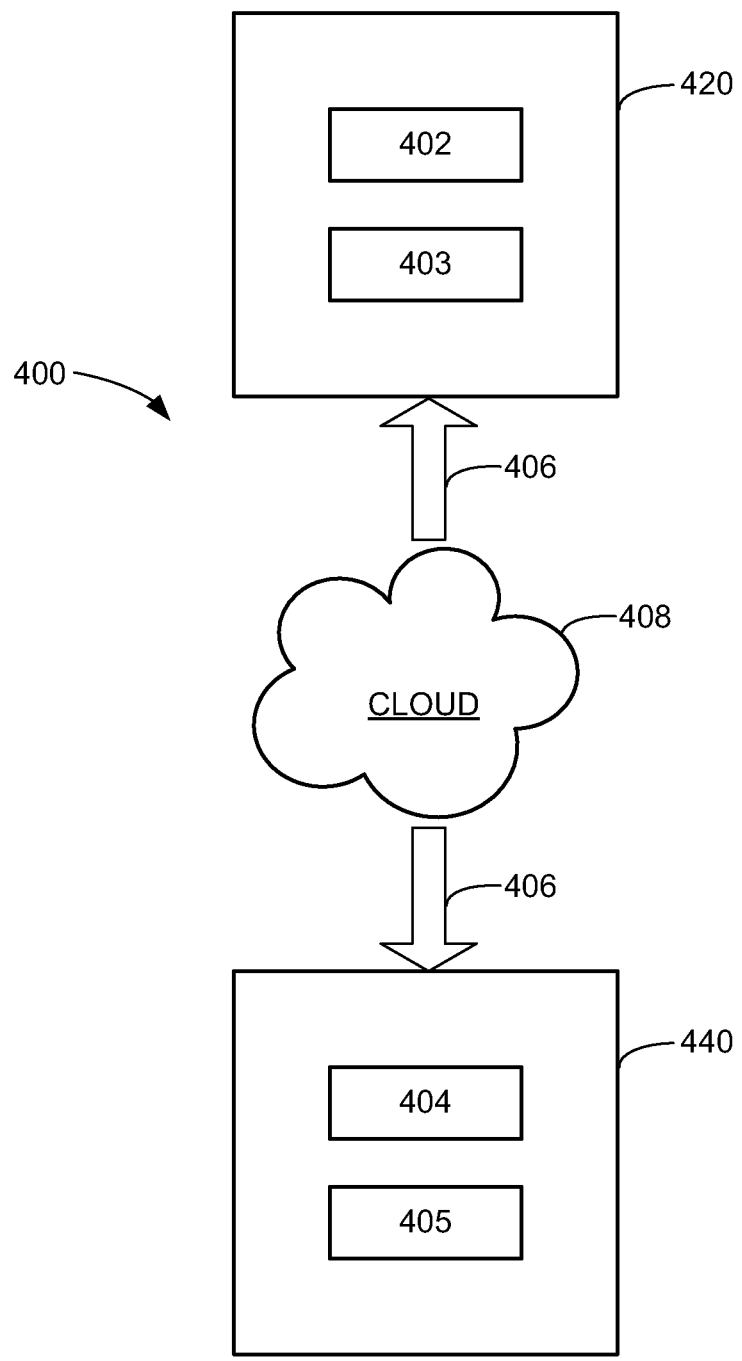
FIG. 4 illustrates a block diagram of an example network that can implement an example monitoring system through a cloud computing infrastructure.

FIG. 4 illustrates a network 400 that can implement the monitoring system through a cloud computing infrastructure 408, where the network includes a target device 420 (including a target processor 402 and a target memory device 403), a security device 440 (including a security processor 404 and a security memory device 405), and a secure transmission line 406 that connects the two devices 420 and 440 by way of a cloud computing infrastructure 408. The secure transmission line 406 can be any transmission line, wireless or wired, that facilitates secured communication through a secure communication technology, such as encryption and/or using a firewall device. Also, the cloud computing infrastructure 408 can be any private or public cloud computing infrastructure that provides secure services and communication through a secure communication technology such as encryption and/or using a firewall device. The two devices 420 and 440 can be any electronic device, such as a personal computer, server, router, bridge, switch, hub, repeater, modem, network interface controller, network driver, or adapter. The respective processors 402 and 404 can be any CPU. The respective memory devices 403 and 405 can be any primary or secondary storage device. Also, the respective processors 402 and 404 can be tightly or loosely coupled to the respective memory devices 403 and 405.

Figure 5:
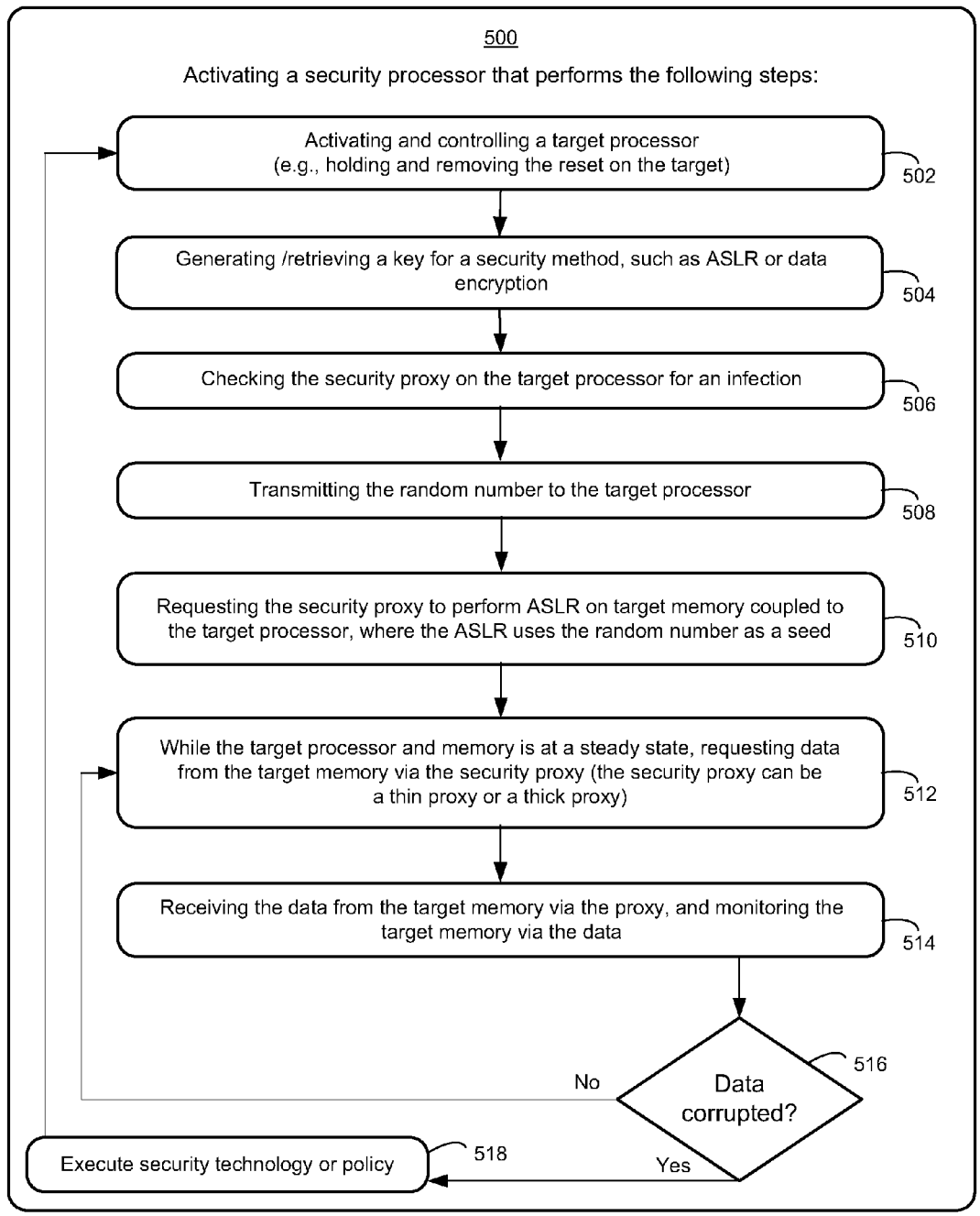
FIG. 5 illustrates a flow chart of a method performed by an example security processor, such as the security processor of FIG. 2, 3, or 4.

FIG. 5 illustrates a flow chart of a method 500 that can be performed by any of the abovementioned security processors, such as the security processors of FIGS. 2-4. Also, the method 500 can utilize any of above mentioned components of the monitoring system, including the components of FIGS. 1-4. The method 500 first requires activating a security processor. Next, at a step 502, the security processor activates and initiates control of a target processor, such as one of the target processors depicted in FIGS. 2-4. In this step, control of the target processor can include holding the target processor or removing a reset function on the target processor.

Next, at a step 504, the security processor generates or retrieves a key, e.g., a random number, that can be used as a seed for a security method, such as ASLR or data encryption. In some embodiments, the step 504 could precede the step 502.

Next, at a step 506, the security processor checks the security proxy rendered by the target processor for an infection. In some embodiments, the security processor or the proxy also checks the target processor or the target memory device for an infection. The step 506 and analogous steps, such as checking the target processor or memory directly, must precede steps 508 and 510 and analogous steps, such as performing a security method on the target processor and/or the target memory device. Such a checking step must occur prior to running a security method to ensure that the security method is not securing an already infected system. Particularly, upon performing the step 506, the security processor transmits the key to the target processor at the step 508, and then at the step 510, requests the security proxy to perform the security method on the target memory device coupled to the target processor. The security method uses the key as a seed. For example, ASLR uses a random number as seed to initiate the ASLR.

Next, at a step 512, while the target processor and the target memory device are at a steady state, the security processor requests data from the target memory device via the security proxy. As mentioned above the security proxy can be a thin proxy or a thick proxy. Also, in some embodiments, the target processor can make such requests directly to the target memory device without the use of the security proxy.

After the request of the step 512, the security processor receives the data from the target memory device via the security proxy at a step 514, where the security processor monitors the target memory device via the received data. In cases where the data is received by way of a thick proxy, such data is pre-processed by the security proxy. This eases processing done by the secure processor. Whereas in cases where the security processor receives data from a thin version of the security proxy, the data is not pre-processed. Either way the complexity and burden of processing is reduced because the proxy and/or the security processor are aware of the key, which can be used to undue the security method. For example, in the case of using ASLR, by having the key, the proxy and/or the security processor can reverse the random arranging of the positions of data. Therefore, with the positions of the data rearranged back to their original state the data can be easily accessed by the security processor without further processing typically associated with ASLR or other preventative security methods. In embodiments where ASLR is utilized, the target OS can receive a seed for ASLR and the security proxy that can be hosted by the target OS receives information from the seed regarding start addresses of desired data and instructions. By receiving the start address, the proxy can generate a file or a data structure, such as a secure hash containing the desired data and instructions.

Next, at a step 516, the security processor determines whether the target memory device has been infected or corrupted. In the case that there is an infection or corruption to the memory, the method 500 executes a security technology or policy (e.g., anti-virus software) at step 518 and then returns to the step 502, where in some embodiments, the security processor resets the target processor and/or the target memory device. Where the target processor and the target memory device are not corrupted or infected, the method 500 continues periodically to request and receive the data from the target memory device, e.g., see the steps 512 and 514.

The monitoring system is beneficial in that it facilitates monitoring a target processor, memory device, and/or OS, even when such are defended by complex preventative security methods, such as ASLR. Not only is monitoring possible without using an overly complex and processor intensive method, but the monitoring is accurate and secure. The monitoring is secure and accurate because the security processor or program is provided from a trusted source, and it is the security processor or program that provides the key to the security method that secures the targets. Further, the processing burden can be unloaded onto the security proxy, which can be executed by at least a second processor.

Also, the proxy security is beneficial in that it executes in the context of the target processor being monitored and the monitoring of the target processor or memory can begin prior to a security method being executed on it. Further, the proxy can have access to memory addresses prior to a security method, such as ASLR. Also, the proxy acting as an agent for the security processor provides an additional level of security. For example, the proxy adds another point to encrypt or physically secure data. Furthermore, the monitor application executing on the security processor can communicate periodically with the security proxy to retrieve any type of information regarding the targets. This information can include raw data, information on state, bios, task management information, information specific to applications, and the like. Upon receiving the information, the monitoring system can take any number of actions, such as shutting down the target processor if it has become infected.

Also, as mentioned, the monitor application can operate without the security proxy, although, in such embodiments, the security processor can take on the entire processing load of the monitoring system. To relieve this burden, components of a computer network such as components of a cloud computing infrastructure can be employed as long as they are trusted not to be infected or corrupted.

Various embodiments described herein can be used alone or in combination with one another. The foregoing detailed description has described only a few of the many possible implementations of the present embodiments. For this reason, this detailed description is intended by way of illustration, and not by way of limitation.

We claim:

1. A method comprising:
    activating and controlling a target processor by a security coprocessor, where the security coprocessor and the target processor are separate processors on a same electronic device;
    generating, by the security coprocessor, a seed for address space layout randomization (ASLR) by executing processor readable instructions stored on a first memory device, where the first memory device is communicatively coupled to the security coprocessor;
    receiving from a target memory device, by the security coprocessor, a first set of data related to a security proxy being executed on the target processor, the target processor coupled to the security coprocessor via a secure transmission line;
    determining whether the security proxy is corrupted by checking the first set of data received from the target memory device; and
    as a result of determining that the security proxy is not corrupted:
        transmitting the seed to the target processor;

requesting the target processor to execute the security proxy to perform ASLR using the seed to obtain start addresses of desired data and instructions in the target memory device;

requesting, via the security proxy, a second set of data from the target memory device while the target processor and the target memory device are at a steady state; and monitoring the target memory device by checking the retrieved second set of data.

2. The method of claim 1, where the seed is a random number.

3. The method of claim 1, where the target memory device is tightly coupled to the target processor.

4. The method of claim 1, further comprising:
reactivating the target processor subsequent to receiving at least one infected or corrupted part of the second set of data.

5. The method of claim 1, where the security proxy is a thick proxy.

6. The method of claim 1, where the security proxy is a thin proxy.

7. An apparatus, comprising:
a target processor; and
a security processor, where the target processor and the security processor are coprocessors, and where the security processor is configured to:
activate and control the target processor;
generate a seed for address space layout randomization (ASLR) by executing processor readable instructions stored on a first memory device;
receive security proxy data that identifies that a security proxy is not corrupted;
transmit the seed to the target processor;
request the target processor to execute the security proxy to perform ASLR using the seed to obtain start addresses of desired data and instructions in a target memory device;
request, via the security proxy, a second set of data from the target memory device while the target processor and the target memory device are at a steady state; and
monitor the target memory device via the second set of data.

8. The apparatus of claim 7, where the seed is a random number.

9. The apparatus of claim 7, where the target memory device is tightly coupled to the target processor.

10. The apparatus of claim 7, where the security processor is further configured to: reactivate the target processor subsequent to receiving at least one infected or corrupted part of the security proxy data.

11. The apparatus of claim 7, where the security proxy is a thick proxy.

12. The apparatus of claim 7, where the security proxy is a thin proxy.

13. The apparatus of claim 7, where the first memory device is communicatively coupled to the security processor.

14. A system, comprising:
a security proxy circuit; and
a first circuit configured to:
activate and control a second circuit, wherein the first circuit and the second circuit are separate processors on a same electronic device;
generate a seed for address space layout randomization (ALSR);
receive from the second circuit a first set of data related to the security proxy circuit;
identify whether the security proxy circuit is corrupted by checking the first set of data received from the second circuit; and
as a result of determining that the security proxy circuit is not corrupted:
transmit the seed to the second circuit; and
request the second circuit to execute the security proxy circuit to perform ASLR using the seed to obtain start address of desired data and instructions in a target memory device,
where the security proxy circuit is configured to:
request a second set of data from the target memory device while the second circuit and the target memory device are at a steady state; and
monitor the target memory device by checking the retrieved second set of data.

15. The system of claim 14, where the target memory device is tightly coupled to the second circuit.

16. The system of claim 14, where the first circuit is configured to: reactivate the second circuit subsequent to receiving at least one corrupted part of the second set of data.

17. The system of claim 14, where the security proxy circuit is a thick proxy.

18. The system of claim 14, where the security proxy circuit is a thin proxy.

19. The system of claim 14, where the seed is a random number.

20. The system of claim 14, where the seed is generated by executing processor readable instructions stored on a first memory device coupled to the first circuit.

* * * * *